Figure 6:
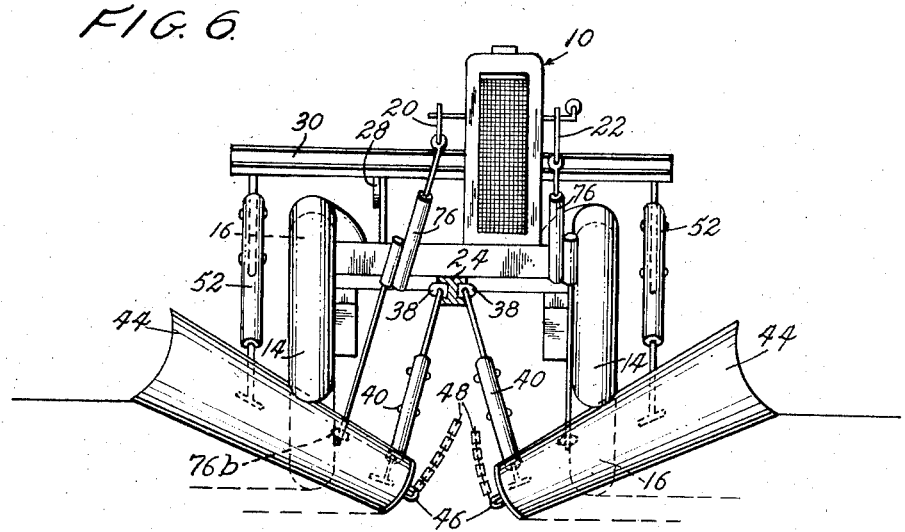

Oct. 21, 1958  E. BROCKLY  2,856,709
GRADING AND DITCHING ATTACHMENT FOR A TRACTOR
Filed Oct. 2, 1953  4 Sheets-Sheet 1

INVENTOR.
EDMOND BROCKLY
BY
Patrick D. Beavers
ATTORNEY

Oct. 21, 1958  E. BROCKLY  2,856,709
GRADING AND DITCHING ATTACHMENT FOR A TRACTOR
Filed Oct. 2, 1953  4 Sheets-Sheet 2
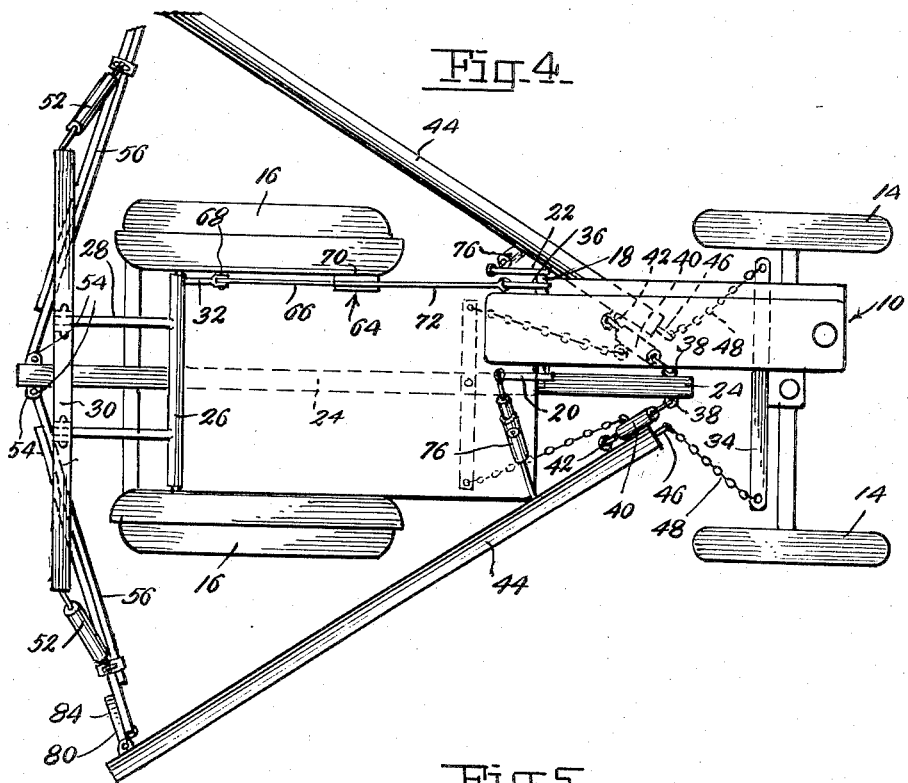
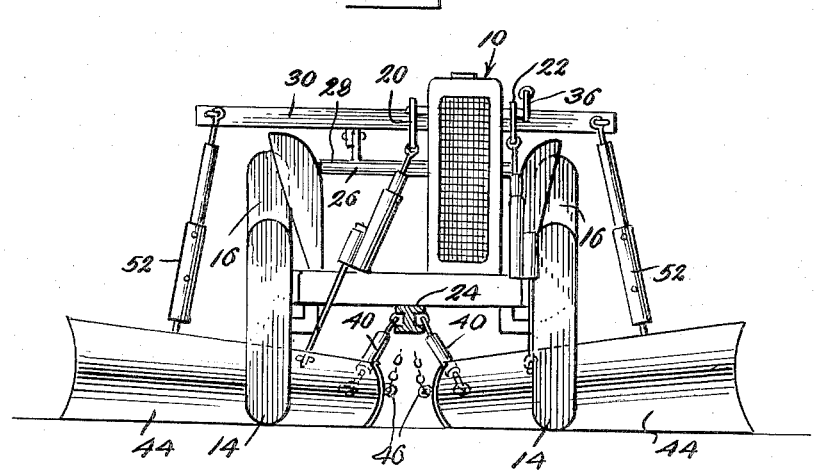
INVENTOR.
EDMOND BROCKLY
BY
Patrick D Beavers
ATTORNEY Oct. 21, 1958   E. BROCKLY   2,856,709
GRADING AND DITCHING ATTACHMENT FOR A TRACTOR
Filed Oct. 2, 1953   4 Sheets-Sheet 3

INVENTOR.
EDMOND BROCKLY
BY
Patrick D. Beavers
ATTORNEY

Oct. 21, 1958  E. BROCKLY  2,856,709
GRADING AND DITCHING ATTACHMENT FOR A TRACTOR
Filed Oct. 2, 1953  4 Sheets-Sheet 4
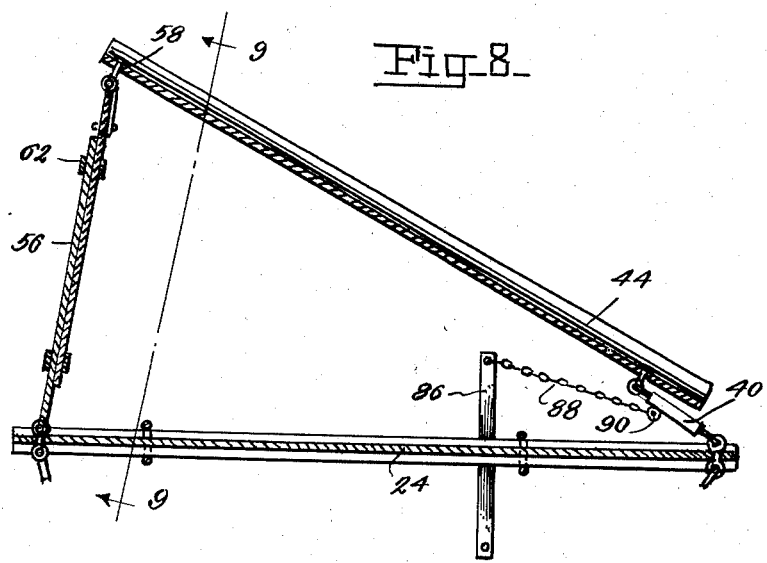
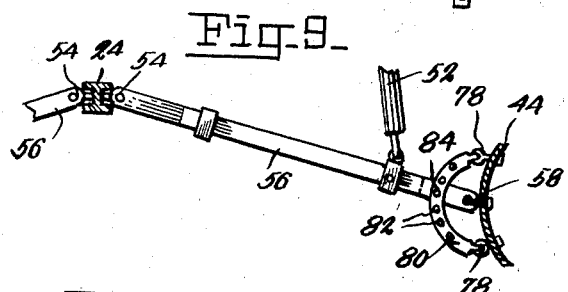
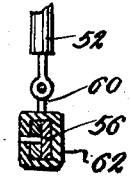
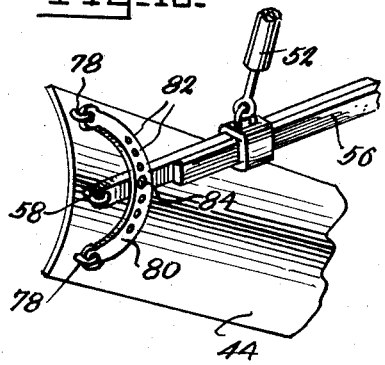
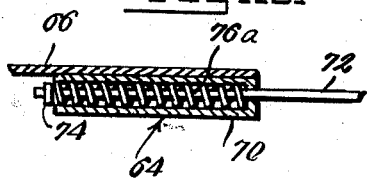
INVENTOR.
EDMOND BROCKLY
BY
Patrick D Beavers
ATTORNEY United States Patent Office 2,856,709
Patented Oct. 21, 1958

2,856,709

GRADING AND DITCHING ATTACHMENT FOR A TRACTOR

Edmond Brockly, Addie, Idaho

Application October 2, 1953, Serial No. 383,847

3 Claims. (Cl. 37—172)

This invention relates to a grading and ditching attachment for a tractor and has for its primary object to move earth, snow or the like to one side of a right of way and to produce a smooth surface for the passage of traffic.

Another object is to form a ditch of a predetermined width and depth in a selected area of the ground.

The above and other objects may be attained by employing this invention which embodies among its features a pair of divergent earth moving blades mounted beneath a farm tractor of the type having power actuated lift arms, means connected to the farm tractor adjacent the forward end thereof and connected to the convergent ends of the blades for exerting pull on the blades as the tractor advances, compressible links, connected to the blades and to the lift arms of the tractor for raising or lowering the convergent ends of the blades, and means carried by the tractor adjacent the rear end thereof for movement in a vertical arcuate path and connected through the blades adjacent their divergent ends for raising or lowering the divergent ends of the blades, end means connected to the last mentioned means and to the power actuated lift arms for moving said means.

Other features include extensible struts carried by the tractor adjacent the rear end thereof and connected to the blades adjacent their divergent rear ends for holding said blades in selected angular positions with relation to one another, end means carried by the blades and connected to the struts for altering the angular relationship between the blades and the surface being worked.

Figure 7:
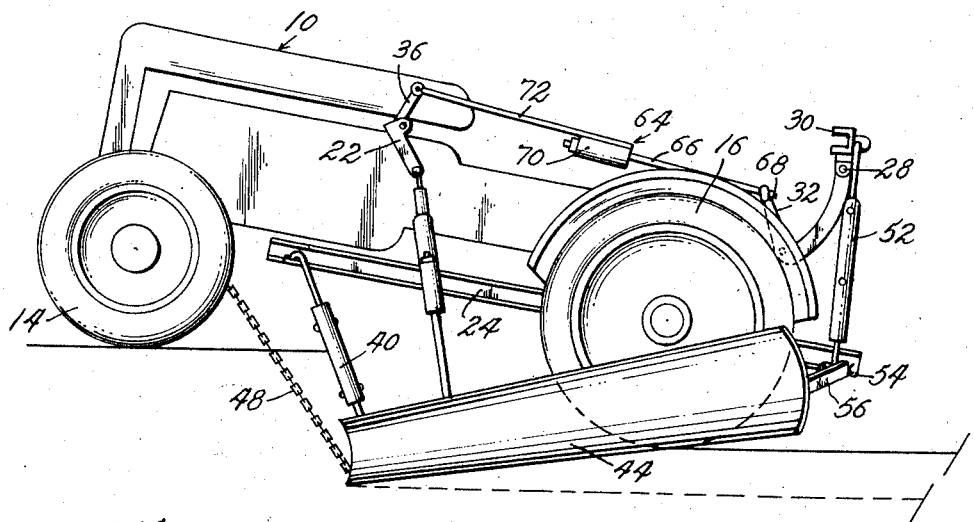

In the drawings:

Figure 1 is a side view of a tractor equipped with a grading and ditching attachment embodying the features of this invention, Figure 2 is a rear view of the tractor illustrated in Figure 1, Figure 3 is a fragmentary side view of the opposite side of the tractor, Figure 4 is a top plan view of the tractor equipped with this improved grading and ditching attachment, Figure 5 is a front view of the tractor illustrated in Figure 1, Figure 6 is a view similar to Figure 5 showing the blades set for ditching, Figure 7 is a side view of the structure illustrated in Figure 6, Figure 8 is a fragmentary horizontal sectional view through the attachment, Figure 9 is a fragmentary sectional view taken substantially on the line 9—9 of Figure 8, Figure 10 is an enlarged fragmentary perspective view of a portion of a blade and an extensible strut showing the manner in which the blade and strut are coupled for adjustment of the blade relative to the surface being worked, Figure 11 is a fragmentary enlarged sectional view through the strut, and Figure 12 is a fragmentary enlarged sectional view through the extensible link connecting the rear elevator with the power lift arms of the tractor.

Referring to the drawings in detail a farm tractor designated generally 10 is equipped with a conventional power source housed within a casing 12 mounted adjacent the forward end of the tractor which is supported on conventional steering wheels 14. The rear end of the tractor is supported on conventional traction wheels 16 and carried by the tractor intermediate its forward and rear ends is a transversely extending rock shaft 18 carrying adjacent opposite ends power actuated lift arms 20 and 22 which move in vertical arcuate paths about the axis of the shaft 18 adjacent opposite sides of the tractor. The structure so far described is conventional and forms no part of this invention except as it is combined therewith.

The grading and ditching attachment includes an elongated main supporting bar 24 which is adapted to be secured to the underside of the frame of the tractor to extend longitudinally beneath the tractor substantially midway between opposite sides thereof. Carried by the tractor adjacent the rear end thereof for rocking motion about a horizontal transversely extending axis is a rock shaft 26 carrying adjacent opposite ends rearwardly extending rock arms 28 to which is connected remote from the rock shaft 26 a transversely extending lift beam 30. A lever 32 is carried by the rock shaft 36 for rocking movement therewith and as the lever is moved about the axis of the rock shaft 26, the lift beam 30 will be moved in a vertical arcuate path above and adjacent the rear end of the tractor 10. A transversely extending draw bar 34 is carried by the tractor 10 adjacent the forward end thereof, and carried by the shaft 18 adjacent the arm 22 is a lever 36 which is moveable in an arcuate path in unison with the shaft 18.

Connected to suitable eyes 38 carried by the main supporting beam 24 adjacent the forward end thereof are telescopic links 40 which are connected to suitable eyes 42 carried by converging earth working blades 44, the convergent ends of which are disposed adjacent and below the forward end of the main supporting beam 24 as will be readily understood upon reference to the drawings. Eyes 46 are carried by the blades 44 and project forwardly from the forward ends thereof, and connected to the eyes and to the draw bar 34 adjacent opposite ends thereof are flexible draft elements 48 such as chains. It will thus be seen that as the tractor advances, the blades 44 will be moved in unison therewith and should an obstacle be encountered by the forward ends of the blades, the links 40 will be compressed to permit the blades to ride over the obstacle.

Connected to the lift beam 30 adjacent opposite ends thereof through the medium of eyes 50 are telescopic links 52, and carried by the means supporting beam 24 and projecting laterally therefrom adjacent the rear end thereof are eyes 54 to which are connected extensible struts 56. These struts extend outwardly from the beam 24 and are connected adjacent therein remote from the beam through suitable eyes 58 with the blades 44 adjacent the rear ends thereof. It is to be noted that the blades are transversely curved with their concave sides disposed outwardly and that the eyes 58 are disposed midway between the upper and lower edges of the blades. The ends of the links 52 remote from those which are connected to the lift beam 30 are connected to eyes 60 carried by loops 62 which encircle the extensible struts 56 so that as the lift beam 30 moves in its vertical arc, the rear ends of the blades 44 will be raised or lowered.

Connecting the lever 32 with the lever 36 is a compressible link 64 which comprises an elongated rod 66 which passes through the lever 32 and carries external screw threads upon which a nut 68 is threadedly engaged for adjusting the position of the bar 66 relative to the lever 32.

Carried by the end of the rod 66 remote from that carrying the nut 68 is a tubular housing 70, and extending through the end of the housing remote from the nut 68 is a rod 72. A head 74 is carried by the rod 72 within the housing 70, and encircling the rod between the head and the end of the housing 70 through which the rod 72 extends is a compression coil spring 76a. The end of the rod 72 remote from that carrying the head 74 is connected to the lever arm 36 carried by the shaft 18, as the lift arms 20 and 22 move upwardly in their arcuate paths, the link 64 will exert pull on the lever 32 to lift the lift beam 30 and the rear ends of the blades 44 with the result that the spring 76 will cushion the lifting effort of the lever 36 on the lift beam 30.

Carried by the blades 44 slightly to the rear of the convergent ends thereof and projecting inwardly from said blades are eyes 76b to which are connected the lower ends of telescopic links 76, the upper ends of which are connected to the lift arms 20 and 22 so that as the lift arms move in their vertical arcs, the forward ends of the blades will be raised or lowered. The links 76 are cushioned so that should a blade 44 encounter an obstacle, its respective link 76 will telescope to permit the blade to move over the obstacle without damage.

In order to adjust the angular relation of the blades to the surface being worked, each blade is provided adjacent its upper and lower edge adjacent its respective strut 56 with eyes 78 and connected to the upper and lower eyes of each respective blade is a quandrant 80 having extending therethrough an arcuate series of openings 82 for the reception of a bolt 84 which extends through a selected opening 82 and through an opening formed in the adjacent strut 56 adjacent the eye 58. It will thus be seen that by extracting the bolt 84 from an opening 82, its respective blade may be tilted to a selected position in which the opening in the strut 56 aligns with a selected opening 82 in the quadrant 80 and with the bolt 84 inserted in the aligned openings, the blade will be held at the desired angle.

In use with the parts mounted on the tractor as illustrated, it is obvious that as the tractor advances, pull will be exerted on the forward convergent ends of the blades 44 through the medium of the draft element 48 and by raising or lowering the lift arms 20 and 22 in their respective arcuate paths, about the axis of the shaft 18, the depth to which the blades engage the ground may be regulated. Obviously by adjusting the quadrants 80 relative to the struts 56, the angle at which the blades attack the surface being worked may be regulated to suit varying requirements. Should an obstacle be encountered which the blades are incapable of moving, it will be obvious that through the compressibility of the blade supporting links, and the telescopic links carried by the lift arms the blades may harmoniously ride over the obstacle without damage. When it is desired to use the device for the purpose of ditching, the telescopic links 76 are extended as illustrated in Figure 6 to cause the forward ends of the blades to dig deeply below the surface of the ground and the earth moved by the forward ends of the blades will be directed outwardly adjacent opposite sides of the tractor to form a trench having elevated sides. At the same time the struts may be lengthened or shortened to regulate the angular position of one blade with the other so that if so desired an unsymmetrical trench or ditch may be dug. In some instances it may be found desirable to attach a cross arm 86 to the main supporting beam 24 to the rear of the forward end thereof and to connect to opposite ends of the cross arm flexible members 88 such as chains which extend forwardly and are coupled to suitable eyes 90 carried by the links 40 adjacent the lower ends thereof. Such flexible members will serve to stabilize the forward ends of the blades with relation to the tractor.

Having described the invention what is claimed as new is:

1. A grading and ditching attachment for a farm tractor having steering wheels adjacent its forward end, traction wheels adjacent its rear end, and power actuated lift arms mounted on opposite sides of the tractor to move in unison about a common horizontal axis which extends transversely of the tractor intermediate the ends thereof, a lift beam carried by the tractor for movement in a vertical arcuate path above and to the rear of the tractor, earth working blades extending beneath the tractor and between the steering and traction wheels along the paths which converge as they approach the front of the tractor, means carried by the tractor adjacent the forward end thereof and connected to the blades adjacent the convergent ends thereof for moving said blades in unison with the tractor, means connected to the lift arms and to the blades adjacent the convergent ends thereof for raising and lowering the convergent ends of the blades as the lift arms move about the common horizontal axis, elongated links connected to the lift beam and to the blades adjacent the rear divergent ends of the blades for raising and lowering the rear divergent ends of the blades as the lift beam moves in its arcuate path, and a link operatively connected to the lift arms and to the lift beam for moving the lift beam in unison with the lift arms, and extensible struts carried by the tractor and connected to the blades adjacent the rear divergent ends thereof for holding said blades in selected angular relations to one another and to the tractor.

2. A grading and ditching attachment for a farm tractor having steering wheels adjacent its forward end, traction wheels adjacent its rear end, and power actuated lift arms mounted on opposite sides of the tractor to move in unison about a common horizontal axis which extends transversely of the tractor intermediate the ends thereof, a rock shaft carried by the tractor adjacent the rear end thereof to rock about a horizontal axis which extends transversely of the tractor, arms carried by the rock shaft to move therewith in arcuate paths above and adjacent the rear end of the tractor, a lift beam carried by the arms to move in an arcuate path above and to the rear of the tractor, earth working blades extending beneath the tractor between the steering wheels and the traction wheels, said blades lying along paths which converge as they approach the front of the tractor, a draw bar carried by the tractor in front of the convergent ends of the blades, flexible members connected to the draw bar and to the blades adjacent the convergent ends thereof for exerting pull on the blades as the tractor advances, yieldably compressible control links carried by the tractor in advance of the blades and connected to the blades adjacent the convergent ends thereof for maintaining the forward ends of the blades separated, yieldably compressible links connected to the blades adjacent the convergent ends of the blades upon movement of the lift arms, yieldingly compressible links carried by the lift beam and connected to the blades adjacent the rear divergent ends thereof for raising or lowering the rear ends of the blades as the lift beam moves in its arcuate path, a lever carried by the rock shaft for movement therewith, said lever being movable in an arcuate path above the rock shaft, a yieldingly compressible link connected to the lever and operatively connected to the lift arms for moving the lift beam in unison with the lift arms, and extensible struts carried by the tractor and connected to the blades adjacent the rear divergent ends thereof.

3. The structure defined in claim 2 in which the connections between the extensible struts and the blades comprise perforated quadrants carried by the blades and pins extend through the extensible struts and selected perforations in the quadrants to hold the blades in selected angular positions relative to the surface being worked.

References Cited in the file of this patent

UNITED STATES PATENTS

| | | |
|---|---|---|
| 1,019,811 | Lister | Mar. 12, 1912 |
| 1,401,614 | Larson | Dec. 27, 1921 |
| 2,011,777 | Ritchie | Aug. 20, 1935 |
| 2,358,282 | Ray | Sept. 12, 1944 |
| 2,372,459 | Todd | Mar. 27, 1945 |
| 2,659,988 | Braden et al. | Nov. 24, 1953 |